(12) United States Patent
Aromin

(10) Patent No.: US 11,063,419 B2
(45) Date of Patent: Jul. 13, 2021

(54) GFCI WITH CAPACITIVE POWER SUPPLY CIRCUIT

(71) Applicant: Victor V Aromin, West Warwick, RI (US)

(72) Inventor: Victor V Aromin, West Warwick, RI (US)

(73) Assignee: Tower Manufacturing Corporation, Providence, RI (US)

( * ) Notice: Subject to any disclaimer, the term of this patent is extended or adjusted under 35 U.S.C. 154(b) by 221 days.

(21) Appl. No.: 16/009,156

(22) Filed: Jun. 14, 2018

(65) Prior Publication Data

US 2018/0366939 A1 Dec. 20, 2018

Related U.S. Application Data

(60) Provisional application No. 62/519,322, filed on Jun. 14, 2017.

(51) Int. Cl.
| | |
|---|---|
| *H02H 3/16* | (2006.01) |
| *G05F 1/445* | (2006.01) |
| *H02H 3/33* | (2006.01) |
| *H02H 1/06* | (2006.01) |
| *H02H 3/347* | (2006.01) |

(52) U.S. Cl.
CPC ............. *H02H 3/162* (2013.01); *G05F 1/445* (2013.01); *H02H 1/06* (2013.01); *H02H 3/33* (2013.01); *H02H 3/331* (2013.01); *H02H 3/347* (2013.01)

(58) Field of Classification Search
CPC .......... G05F 1/445; H02H 1/06; H02H 3/162; H02H 3/33; H02H 3/331; H02H 3/347
See application file for complete search history.

(56) References Cited

U.S. PATENT DOCUMENTS

| 6,052,266 A | * | 4/2000 | Aromin | ................... | H01H 47/04 |
| | | | | | 361/42 |
| 2007/0035898 A1 | * | 2/2007 | Baldwin | ................ | H02H 3/335 |
| | | | | | 361/42 |
| 2014/0098446 A1 | * | 4/2014 | Aromin | .................... | H02H 3/16 |
| | | | | | 361/42 |
| 2017/0367277 A1 | * | 12/2017 | Mohindra | ............ | A01G 25/162 |

* cited by examiner

*Primary Examiner* — Rexford N Barnie
*Assistant Examiner* — Elim Ortiz

(57) ABSTRACT

A cool running ground fault circuit interrupter (GFCI) with radio frequency (RF) noise suppression and a Capacitive Power Supply tbr interrupting the flow of current through a pair of load and neutral lines extending between an input power source and a load is provided. The GFCI includes a pair of switches disposed between the input power source and the load. The switches are actuated by a relay circuit initially powered by a booster circuit and a constant on power supply. A capacitive power supply for cool operation of the GFCI is connected to the load line via a current limiting resistor and provides power to the constant on power supply circuit.

8 Claims, 2 Drawing Sheets

GFCI WITH CAPACITIVE POWER SUPPLY CIRCUIT

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:
1. United States provisional patent application 62/519,322, entitled "A Ground Fault Circuit Interrupter (GFCI) with Capacitive Power Supply Circuit", naming Victor Aromin as inventor, filed 14 Jun. 2017.

FIELD OF USE

The present invention relates generally to electrical safety devices and more particularly to ground fault circuit interrupters (GFCI).

DESCRIPTION OF PRIOR ART (BACKGROUND)

Conventional electrical appliances typically receive alternating current (AC) power from a power supply, such as an electrical outlet, through a pair of conducting lines. The pair of conducting lines, often referred to as the line and neutral conductors, enable the electrical appliance, or load, to receive the current necessary to operate.

The connection of an electrical appliance to a power supply by a pair of conducting lines creates a number of potentially dangerous conditions. In particular, there exists the risk of ground fault and grounded neutral conditions in the conducting lines. A ground fault condition occurs when there is an imbalance between the currents flowing in the line and neutral conductors. A grounded neutral condition occurs when the neutral conductor is grounded at the load. A ground fault condition is extremely dangerous, and can result in serious injury.

Ground fault interrupters include ground fault circuit breakers, ground fault receptacles, and even cord mounted ground fault protection devices. Ground fault interrupters may be troubled by false tripping, even though they pass all present industry standards. One cause of false tripping, is disconnection of the power to inductive appliances, particularly by unplugging the appliances.

Examples of these appliances include electric shavers, high intensity lamps, and small cooling fans, such as are used for cooling electronic equipment. Unplugging these appliances generates an arc between the plug and the receptacle, resulting in the superimposition of several volts of wide band noise onto the power line. Due to the wide band nature of the noise, even a very small stray coupling capacitance will couple the noise from the power line conductor into the ground fault circuit, causing a false trip.

A typical ground fault interrupter includes an operational amplifier which amplifies the sensed ground fault signal and applies the amplified signal to a window comparator which compares it to positive and negative reference signals. If either reference value is exceeded, a trip signal is generated. A common type of ground fault detection circuit is the dormant oscillator detector. This detector includes a first sensor coil through which the line and neutral conductors of the protected circuit pass. The output of the first sensor coil is applied through a coupling capacitor to the above-described operational amplifier followed by a window comparator. A line-to-ground fault causes the amplified signal to exceed the reference value and generates a trip signal.

The dormant oscillator ground fault detector includes a second sensor coil through which only the neutral conductor passes. A neutral-to-ground fault couples the two detector coils causing the amplifier to oscillate which also results in generation of a trip signal.

It has been found that wide band noise induced by load related switching phenomena such as is caused by unplugging, inductive appliances causes false tripping of the ground fault interrupter.

Ground fault circuit interrupters are well known in the art and are commonly used to protect against ground fault and grounded neutral conditions. In general, GFCI devices sense the presence of ground fault and grounded neutral conditions in the conducting lines and in response thereto, open at least one of the conducting lines between the power supply and the load to eliminate the dangerous condition.

In U.S. Pat. No. 5,177,657, to M. Baer et al, there is disclosed a ground fault interrupter circuit which interrupts the flow of current to a pair of lines extending between a source of power and a load. The ground fault interrupter circuit includes a circuit breaker comprising a normally open switch located in one or both of the lines, a relay circuit for selectively closing the normally open switch, an electronic latch circuit operable in first and second bi-stable states and a fault sensing circuit for sensing the presence of a fault condition in at least one of the lines. The electronic latch circuit causes the relay circuit to close the normally open switch and maintain the normally open switch in its closed position when the electronic latch circuit is in the first bi-stable state. The electronic latch circuit also causes the relay circuit to permit the normally open switch to return to its normally open condition when the latch circuit is in its second bi-stable state. A fault sensing circuit senses the presence of a fault condition in at least one of the lines and causes the electronic latch to latch in its second state upon detection of the fault condition.

In U.S. Pat. No. 5,418,678 to T. M. McDonald, there is disclosed an improved ground fault circuit interrupter (GFCI) device which requires manual setting following initial connection to an AC power source or termination of a power source interruption. The improved GFCI device utilizes a controlled switching device which is responsive to a load power signal for allowing the relay contact sets of the GFCI device to be closed only when power is being made available at the output or load terminals. The controlled switching device preferably comprises an opto-isolator or other type of switching device which provides isolation between the GFCI input and output terminals when the relay contact sets are open. The improved GFCI device may be incorporated into portable units, such as plug-in or line cord units, for use with unprotected AC receptacles.

In U.S. Pat. No. 4,816,957 to L. F. Irwin there is disclosed an adapter unit comprising a moisture resistant housing within which is carried an improved, self-testing ground line fault interrupter device. The improved device is electrically interconnected with a connector carried externally of the adapter housing so that the unit can be plugged directly into a standard duplex outlet of an existing circuit. The apparatus includes circuitry that automatically tests the operability of the device when it is plugged into a duplex outlet without the need for manual manipulation of test buttons or other overt action by the user.

In U.S. Pat. No. 4,578,732 to C. W. Draper et al there is disclosed a wall socket type ground fault circuit interrupter having a pair of sockets, a reset button and a test button that are accessible from the front of the interrupter. The interrupter has latched snap-acting contacts and a novel latching relay structure for maintaining the snap-acting contacts in a circuit making position. The snap-acting contacts permit all of the components including the monitoring toroids and the power supply to be respectively located and connected at the load side of the snap-acting contacts so that all of the circuits of the interrupter are de-energized when the contacts snap to a circuit opening position. The snap-acting contact mechanism and relay are provided with structures which provide the interrupter with a trip-free mode of contact actuation and accordingly a tease-proof snap-acting contact operation.

One drawback of GFCI devices of the type described above is that the GFCI device generally includes a large solenoid to selectively open and close the switching device. Specifically, the solenoid generally requires a constant supply of line voltage (approximately 120 volts) in order to switch and sustain the solenoid in its energized state. As a consequence, the solenoid acts as a large power drain source.

Thus, there is a need for a solenoid of sufficient rating for use in a line voltage GFCI device but with reduced tendency to fail due to high voltages and currents associated with typical line voltages.

There is also a need for a ground fault interrupter which does not generate a false trip in response to wide band noise in the protected circuit.

There is also a need for such a ground fault circuit with improved immunity to wide band noise which also responds to sputtering arc faults.

SUMMARY OF THE INVENTION

It is an object of the present invention to provide a new and improved ground fault circuit interrupter (GFCI).

It is another object of the present invention to provide a GFCI which senses the presence of ground fault and grounded neutral conditions in the conducting lines, and in response thereto, includes a solenoid which opens at least one of the conducting lines between the power supply and the load.

It is yet another object of the present invention to provide a GFCI of the type described above wherein the solenoid can be energized and sustained in the energized state with minimal power drain.

It is still another object of the present invention to provide a GFCI of the type described above wherein the solenoid can be energized and sustained in the energized state with minimal heat build-up.

It is a further object of the present invention to provide a GFCI of the type described above which may be mass produced, has a minimal number of parts, and can be easily assembled.

A GFCI constructed according to this invention for interrupting the flow of current through a pair of lines extending between a source of power and a load comprises a circuit breaker having a switch located in one of said lines, said switch having a first position in which the source of power in its associated line is not connected to the load and a second position in which the source of power in its associated line is connected to the load, a relay circuit for selectively moving and maintaining said switch in either said first position or said second position, said relay circuit including a solenoid operable in either an energized state or a de-energized state, said solenoid setting said switch in said second position when in its energized state and setting said switch in said first position when in its de-energized state, a booster circuit for selectively supplying a first voltage to the solenoid sufficient to cause said solenoid to switch from its de-energized state to its energized state, said first voltage being supplied to said solenoid through said switch when said switch is in its first position, a power supply circuit, said power supply circuit supplying a second voltage to the solenoid, said second voltage being sufficient to maintain the solenoid in its energized state after being initially energized by the first voltage, the second voltage being less than the first voltage, the second voltage being insufficient to switch said solenoid from its de-energized state to its energized state, a latch circuit operable in first and second bi-stable states, said latch circuit allowing said solenoid to switch from its de-energized state to its energized state and remain in its energized state when in said first bi-stable state and causing said solenoid to switch from its energized state to its de-energized state and remain in its de-energized state when in said second bi-stable state, and a fault detecting circuit for detecting the presence of a fault condition in at least one of said lines extending between the power and the load and for causing said latch circuit to latch in its second bi-stable state upon detection of said fault condition. In addition the circuit contains a fault detecting circuit for detecting the presence of a fault condition in at least one of said lines extending between the power and the load and for causing said latch circuit to latch in its second bi-stable state upon detection of said fault condition. The fault detecting circuit comprises a 26V Zener shunt regulator, an OP amp, and a SCR driver; and at least one passive RF noise suppressor for preventing RF noise from being amplified by the OP amp and inadvertently triggering the SCR driver. The circuit also includes a light emitting diode circuit for indicating the GFCI is operating normally.

Another GFCI constructed according to this invention for interrupting the flow of current through a pair of lines extending between a source of power and a load comprises a circuit breaker having a switch located in one of said lines, said switch having a first position in which the source of power in its associated line is not connected to the load and a second position in which the source of power in its associated line is connected to the load, a relay circuit for selectively moving and maintaining said switch in either said first position or said second position, said relay circuit including a solenoid operable in either an energized state or a de energized state and means coupled to said solenoid for controlling the state of said solenoid, said solenoid setting said switch in said second position when in its energized state and setting said switch in said first position when in its de-energized state, a booster circuit for selectively supplying a first voltage to the solenoid sufficient to cause said solenoid to switch from its de-energized state to its energized state, said first voltage being supplied to said solenoid through said switch when said switch is in its first position, a power supply circuit, said power supply circuit supplying a second voltage to the solenoid, said second voltage being sufficient to maintain the solenoid in its energized state after being initially energized by the first voltage, the second voltage being less than the first voltage, the second voltage being insufficient to switch said solenoid from its de-energized state to its energized state, and a fault detecting circuit for detecting the presence of a fault condition in at least one of said lines extending between the power and the load and for causing said latch circuit to latch in its second bi-stable state upon detection of said fault condition.

Another GFCI constructed according to this invention for interrupting the flow of current through a pair of lines extending between a source of power and a load comprises a circuit breaker having a switch located in one of said lines, said switch having a first position in which the source of power in its associated line is not connected to the load and a second position in which the source of power in its associated line is connected to the load, a relay circuit for selectively moving and maintaining said switch in either said first position or said second position, said relay circuit including a solenoid operable in either an energized state or a de energized state, said solenoid setting said switch in said second position when in its energized state and setting said switch in said first position when in its de-energized state, a power supply circuit for supplying power to said GFCI, a latch circuit operable in first and second bi-stable states, said latch circuit allowing said solenoid to switch from its de-energized state to its energized state and remain in its energized state when in said first bi-stable state and said latch circuit causing said solenoid to switch from its energized state to its de-energized state and remain in its de-energized state when in said second bi-stable state, a fault detecting circuit for detecting the presence of a fault condition in at least one of said lines extending between the power and the load and for causing said latch circuit to latch in its second bi-stable state upon detection of said fault condition, and a trip indicating circuit for indicating that said fault detecting circuit has detected a fault condition.

Another GFCI constructed according to this invention for interrupting the flow of current through a pair of lines extending between a source of power and a load comprises a circuit breaker having a switch located in one of said lines said switch having a first position in which the source of power in its associated line is not connected to the load and a second position in which the source of power in its associated line is connected to the load, a relay circuit for selectively moving and maintaining said switch in either said first position or said second position, said relay circuit including a solenoid operable in either an energized state or a de energized state, said solenoid setting said switch in said second position when in its energized state and setting said switch in said first position when in its de-energized state, a power supply circuit for supplying power to said GFCI, said power supply circuit including means for applying either a first voltage to said solenoid or a second voltage to said solenoid, a latch circuit operable in first and second bi-stable states, said latch circuit allowing said solenoid to switch from its de-energized state to its energized state and remain in its energized state when in said first bi-stable state and said latch circuit causing said solenoid to switch from its energized state to its de-energized state and remain in its de-energized state when in said second bi-stable state, and a fault detecting circuit for detecting the presence of a fault condition in at least one of said lines extending between the power and the load and for causing said latch circuit to latch in its second bi-stable state upon detection of said fault condition.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION

The following brief definition of terms shall apply throughout the application:

The term "comprising" means including but not limited to, and should be interpreted in the manner it is typically used in the patent context;

The phrases "in one embodiment," "according, to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example; and If the specification states a component or feature "may," "can," "could," "should," "preferably," "possibly," "typically," "optionally," "for example," or "might" (or other such language) be included or have a characteristic, that particular component or feature is not required to be included or to have the characteristic.

Figure 1:
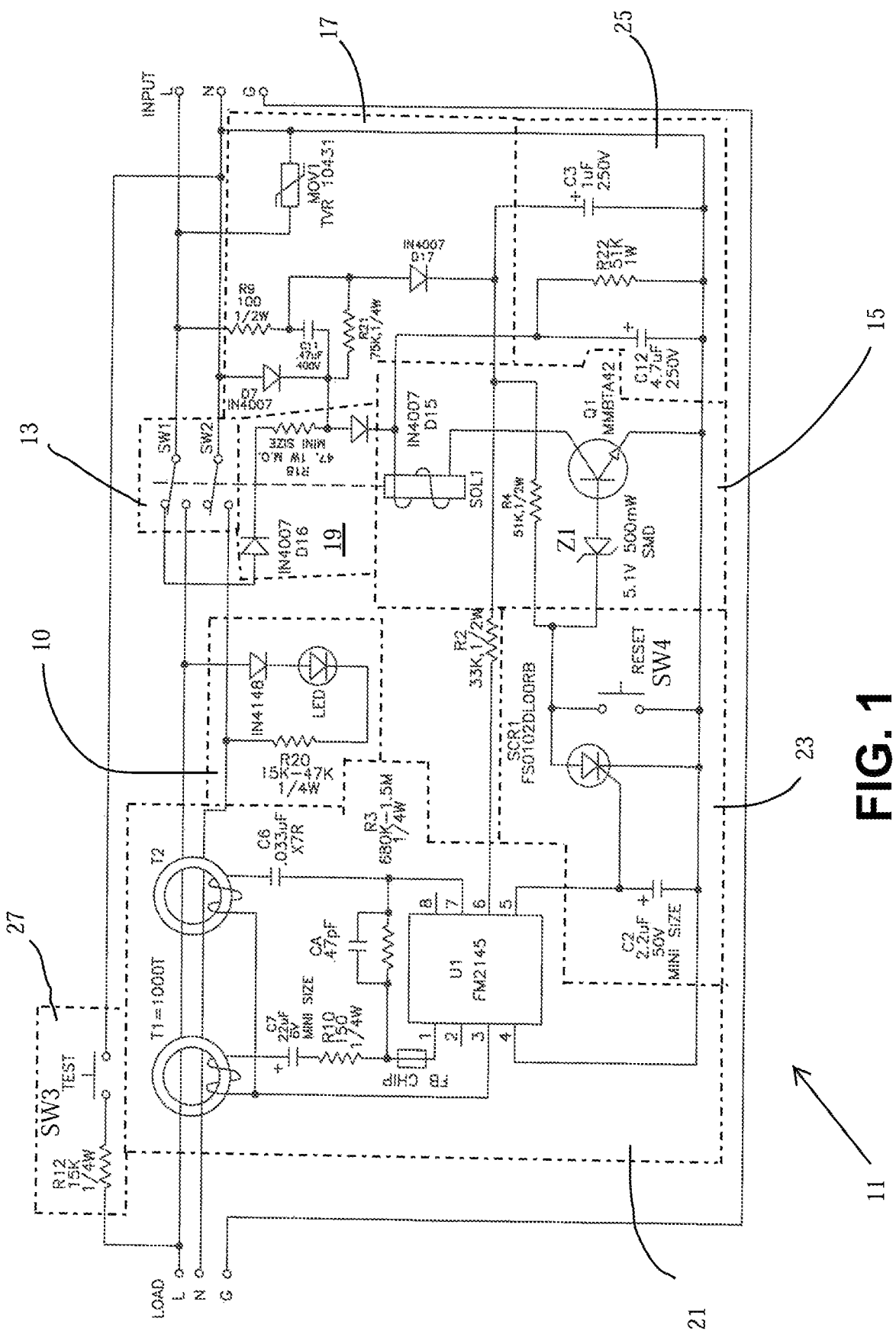
FIG. 1 is a schematic circuit diagram of a ground fault circuit interrupter (GFCI) of the present invention.

Referring now to the drawings and more particularly to FIG. 1, there is shown a ground fault circuit interrupter (hereinafter GFCI) circuit constructed according to the teachings of the present invention, the GFCI being represented generally by reference numeral 11.

As will be discussed in detail below, GFCI 11 is automatically set to protect a load from ground fault conditions upon the initial plugging in of the load to a power source. GFCI 11 is also automatically set to protect the load from ground fault conditions once power is restored to the power source after a loss of power. Furthermore, once GFCI 11 protects the load from a ground fault condition, GFCI 11 can be manually reset to protect against further ground fault, conditions.

GFCI 11 includes a circuit breaker 13, a relay circuit 15, a power supply circuit 17, a booster circuit 19, a fault detection circuit 21, a bi-stable electronic latch circuit 23, a filter circuit 25, a trip indicating circuit 10, and a test circuit 27.

Circuit breaker 13 includes a pair of single-pole, double-throw switches SW1 and SW2 which are located in the line and neutral conductive lines, respectively, between a power source and a load. Circuit breaker 13 acts to selectively open and close the pair of conductive lines. Switches SW1 and SW2 can be positioned in either of two connective positions. In the first connective position, which is illustrated in FIG. 1, switches SW1 and SW2 are positioned such that the power source is not connected to the load but is connected to booster circuit 19. In the second connective position, which is the opposite position illustrated in FIG. 1, switches SW1 and SW2 are positioned such that the power source is connected to the load but not to booster circuit 19. In both positions, the power source is connected to power supply 17.

Relay circuit 15 acts to selectively position switches SW1 and SW2 in either its first connective position or its second connective position. Relay circuit 15 comprises a solenoid SOL1, a transistor Q1, biasing circuit comprising resistor R4 and Zener Z1.

Solenoid SOL1 is ganged to the circuit breaker contacts of switches SW1 and SW2 and is responsible for selectively controlling the connective position of switches SW1 and SW2. Before power is applied to GFCI 11, solenoid SOL1 positions switches. SW1 and SW2 in their first connective position. When solenoid SOL1 is energized, solenoid SOL1 positions switches SW1 and SW2 in their second connective position.

It should be noted that the particular construction of solenoid SOL1 is unique for conventional GFCI devices. In particular, SOL1 is significantly small in size and requires less power than most solenoids used in prior art GFCI devices. Specifically, solenoid SOL1 has a coil resistance of 5,000 ohms. As a result of the unique construction of solenoid SOL1, line voltage (approximately 120 volts) must be directly supplied to solenoid SOL1 in order to initially energize solenoid SOL1 from its de-energized state. But more importantly, once energized, a constant voltage of only approximately 28 volts is required to be supplied to solenoid SOL1 in order to keep it in its energized state. As will be discussed in detail below, booster circuit 19 is responsible for providing the line voltage to initially energize solenoid SOL1 from its de-energized state and power supply circuit 17 is responsible for supplying the constant voltage of approximately 28 volts to maintain solenoid SOL1 in its energized state. The reduction in the voltage required to maintain solenoid SOL1 in its energized state (approximately 92 volts) significantly reduces the power drain of SOL1 in circuit 11 and also reduces heat build-up which would minimize solenoid. SOL1 useful life.

Transistor Q1 is, for example, an MPSA42 transistor sold by Motorola Corporation and acts to control the current supplied to energize solenoid SOL1. When transistor Q1 is off, current cannot flow through solenoid SOL1. On the other hand, when transistor Q1 is on, current can flow through solenoid SOL1.

Power supply circuit 17 acts to provide power for GFCI circuit 11. Power supply circuit 17 comprises a metal oxide varistor MOV1, a silicon rectifiers D7 and D17, voltage dropping resistors R9 and R21, and capacitor C11. It will be appreciated that capacitor C11 reactance limits the current flowing though rectifiers D7 and D17.

Varistor MOV1 has a value of 150 volts and acts to protect against a voltage surge from, the AC power source. Silicon rectifiers D7 and D17 are preferably IN4007 and act to convert the AC current in the line from the power source into a DC current. Voltage dropping resistors R9 and R21 act to limit the constant input voltage supplied to solenoid SOL1 for the reasons noted above. Capacitor C11 is shown with a value of 0.47 uF but may be any suitable value, and acts to limit the current flowing though rectifiers D7 and D17 and the constant voltage supplied to solenoid SOL1. It will be appreciated that an objective of the capacitive supply circuit arrangement minimizes heat buildup in a confined space, optimizes relay coil SOL1 energy to substantially increase the relay contact forces, providing for a smaller, more rugged and higher product performance for the GFCI. Booster circuit 19 acts to provide a temporary voltage sufficient to initially energize solenoid SOL1 from its de-energized state. Booster circuit 19 comprises a silicon rectifiers D15 and D16 and a surge limit resistor R18. Rectifiers D15 and D16 are preferably IN4007 and act to convert the AC power in the line of the power source to DC power. When switch SW1 is in its first position and upon the application of power to GFCI 11, rectifiers D15 and D16 provide an instant DC voltage to solenoid SOL1 causing solenoid SOL1 to energize which, in turn, causes solenoid SOL1 to move switches SW1 and SW2 to their second connective position. When switches SW1 and SW2 are moved to their second connective position, booster circuit 19 is disconnected from the power source. Resistor R18 has a value of 47 ohms and acts to protect rectifiers D15, D16 and capacitor C11 from over currents.

Fault detection circuit 21 acts to detect both ground fault and grounded neutral conditions in the conductive lines when switches SW1 and SW2 are in their second connective position. Fault detection circuit 21 comprises a sense transformer T1, a grounded neutral transformer T2, a coupling capacitor C7, a noise suppression capacitor CA, a feedback resistor R3, a passive ferrite bead FB Chip for RF suppression, and a ground fault interrupter chip U1.

Figure 2:
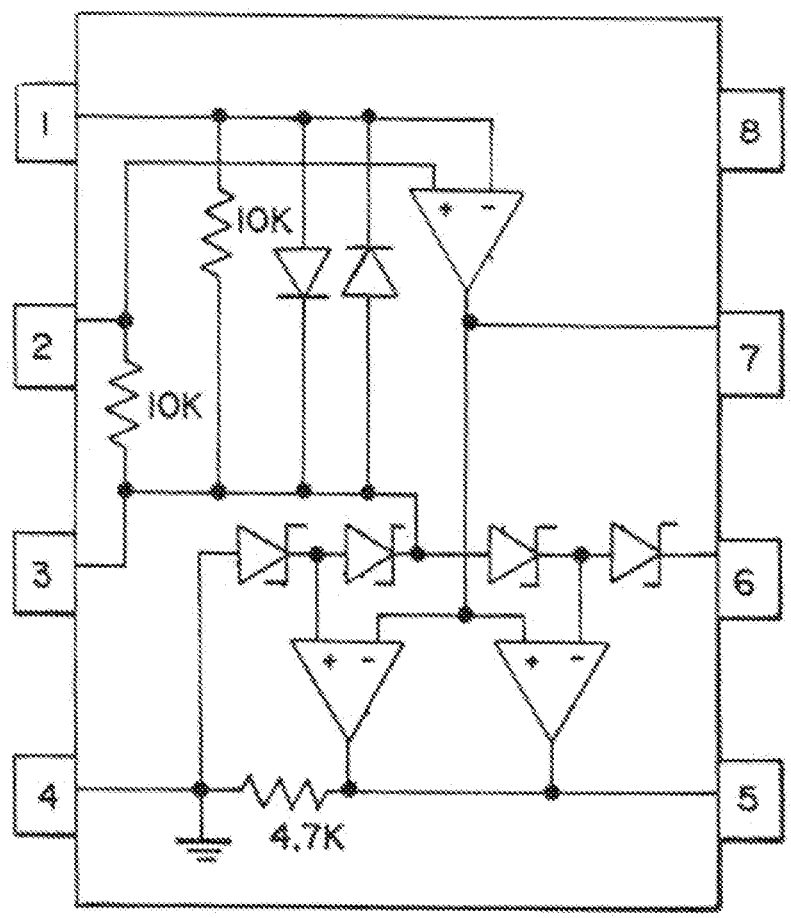
FIG. 2 is a schematic diagram of the integrated circuit forming part of the circuit of FIG. 1.

Ferrite bead FB Chip helps to prevent unwanted RF noise from being coupled into pin 1 of U1, also the inverting input of the Op Amp internal to U1 (see FIG. 2). As noted earlier RF noise presented to the inverting input of Op Amp (pin 1 of U1) may be amplified sufficiently to trigger one of the comparator amplifiers shown in FIG. 2, thereby outputting an unwanted SCR trigger signal on pin 5. It will be appreciated that any suitable passive electric component may be used to suppress unwanted frequency noise.

Transformer T1 is preferably a C-5029-01-00 transformer sold by Magnetic Metals and transformer T2 is preferably a F-3006-01 transformer sold by Magnetic Metals. Sense transformer T1 senses the current differential between the line and neutral conductive lines and upon the presence of a ground fault condition, transformer T1 induces an associated output from its secondary windings. Grounded neutral transformer T2 acts in conjunction with transformer. T1 to sense the presence of grounded neutral conditions and, in turn, induce an associated output. Coupling capacitor C7 has a value of 22 uF and acts to couple the AC signal from the secondary winding of transformer T1 to chip U1. Noise suppression capacitor CA has a value of 0.47. Capacitor CA acts to prevent fault detection circuit 21 from operating in response to line disturbances such as electrical noise and lower level faults.

Tuning capacitor C3 has a value of 0.033 uF and feedback resistor R3 has a value of 680 K to 1.5 Mohms. Together capacitor C3 and resistor R3 act to set the minimum fault current at which fault detection circuit 21 provides an output signal to latch circuit 23. Interrupter chip U1 is preferably an FM2145 low power ground fault interrupter circuit. Chip U1 serves to amplify the fault signal generated by transformer T1 and provide an output pulse on pin 5 to activate latch circuit 23.

Latch circuit 23 acts to take the electrical signal produced by fault detection circuit 21 upon the detection of a ground fault or grounded neutral condition and, in turn, de-energize solenoid SOL1. Latch circuit 23 comprises a silicon controlled rectifier SCR1 operable in either a conductive or a non-conductive state, a noise suppression capacitor C2 and a reset switch SW4. Rectifier SCR1 is preferably an EC103A rectifier and acts to selectively turn on and off transistor Q1 in relay circuit 15. Noise suppression capacitor C2 has a value of 2.2 uF and acts in preventing rectifier SCR1, when in its nonconductive state, from firing as a result of electrical noise in circuit 11. Reset switch SW4 is a conventional push-in type switch and acts when depressed to remove holding current from the anode of rectifier SCR1, causing rectifier SCR1 to turn off when it is in its conductive state.

Resistor R2 and capacitor C3 act as a filter circuit to smooth out the varying DC voltage provided from the power supply and provide a filtered DC voltage to the power input of chip U1. Filter circuit includes a voltage dropping resistor R2 which preferably has a value of 33 K ohms and acts to regulate the appropriate voltage supplied to chip U1. Filter circuit also includes a DC filter capacitor C3 which preferably has a value of 1 uF and acts to filter the ripple of the voltage supplied to chip U1.

Test circuit 27 provides a means of testing whether circuit 11 is functioning properly. Test circuit 27 comprises a current limiting resistor R12 having a value of 15 K ohms and a test switch SW3 of conventional push-in type design. When SW3 is depressed to energize test circuit 27, resistor R12 provides a simulated fault current, to transformer T1 which is similar to a ground fault condition.

In use, GFCI 11 functions in the following manner. Prior to initial connection, switches SW1 and SW2 are normally in their first connective position as shown in FIG. 1.

Upon initial connection of GFCI 11 at one end to the load and at the other end to the power source, line voltage of approximately 120 volts is applied to solenoid SOL1 through booster circuit 19 and energizes solenoid SOL1. Once solenoid SOL1 is energized, solenoid SOL1 causes switches SW1 and SW2 to move into their second connective position (opposite the position shown in FIG. 1), thereby eliminating the supply of power into solenoid SOL1 from booster circuit 19. However, since a constant 28 volts is supplied to solenoid SOL1 from power supply circuit 17, solenoid SOL1 is maintained in its energized state.

With solenoid SOL1 maintained in its energized state rectifier SCR1 is in a nonconductive state and transistor Q1 is on, which enables current to pass to solenoid SOL1. Upon the detection of a ground fault or grounded neutral condition, fault detection circuit 21 sends a current to rectifier SCR1 causing rectifier SCR1 to be in a conductive state which, in turn, turns off transistor Q1. With transistor Q1 off, current does not pass through solenoid SOL1 and therefore solenoid SOL1 becomes de-energized. Once de-energized, solenoid SOL1 causes switches SW1 and SW2 to return to its first connective position, thereby cutting off power from the power source to the load.

Once the fault condition is removed, circuit 11 can be reset by manually depressing switch SW4. Depression of switch SW4 causes current to pass through reset switch SW4 instead of rectifier SCR1, which turns off rectifier SCR1. This, in turn, turns transistor Q1 back on when the switch SW4 is released which enables solenoid SOL1 to become re-energized.

With the load plugged into the power source, if there is a loss of power at the power source, solenoid SOL1 will become de-energized, moving switches SW1 and SW2 back to their first connective position. When power is subsequently restored, solenoid SOL1 will become re energized again, which in turn moves switches SW1 and SW2 to their second position.

Indicator circuit LED-C 10 provides a means of visual indication that the GFCI is functioning normally and has not tripped in response to a ground fault or grounded neutral condition. Indicator circuit LED-C includes a silicon rectifier, a light emitting diode LED and a current limiting resistor R20. The rectifier is preferably an IN4148 rectifier and acts, to convert the AC power of the line to DC power for diode LED. In a non-interrupt state line voltage L is rectified by the rectifying diode and applied to turn on the LED. If the circuit 11 senses a ground fault condition SOL1 is de-energized; thus turning off LED indicator.

The versions of the present invention described above are intended to be merely exemplary and those skilled in the art shall be able to make numerous variations and modifications to it without departing from the spirit of the present invention. All such variations and modifications are intended to be within the scope of the present invention as defined in the appended claims. For example, it should be noted that the particular components which make up the aforementioned embodiments may be interchanged or combined to form additional embodiments.

What is claimed is:

1. A cool running ground fault circuit interrupter (GFCI) with radio frequency (RF) noise suppression for interrupting the flow of current through a pair of load and neutral lines extending between an input power source and a load, the GFCI comprising:
   a circuit breaker having a first switch located in the load line, the first switch having a first position in which the power source is not connected to the load and a second position in which the power source is connected to the load;
   the circuit breaker having a second switch located in the neutral line, the second switch having a first position in which the power source is not connected to the load and a second position in which the power source is connected to the load, and wherein the second switch is ganged to the first switch;
   a relay circuit for selectively moving and maintaining the first and second switch in either the first position or the second position, the relay circuit including a solenoid operable in either an energized state or a de-energized state, the solenoid setting the switch in the second position when in its energized state and setting the switch in the first position when in its de-energized state, the solenoid having a coil resistance of approximately 5,000 ohms;
   a booster circuit for selectively supplying a first voltage to the solenoid sufficient to cause the solenoid to switch from its de-energized state to its energized state, the first voltage being supplied to the solenoid through the first switch when the first switch is in its first position and disengaging when the first switch is in its second position;
   a constant on power supply circuit, the constant on power supply circuit supplying a second voltage to the solenoid, the second voltage being sufficient to maintain the solenoid in its energized state after being initially energized by the first voltage and the second voltage, the second voltage being insufficient to switch the solenoid from its de-energized state to its energized state, and a capacitive power supply or cool operation of the GFCI, wherein the capacitive power supply is connected to the load line via a current limiting resistor and provides power to the constant on power supply circuit.

2. The cool running GFCI as in claim 1 further comprises a fault detecting circuit for detecting the presence of a fault condition in the load or neutral lines extending between the power source and the load, wherein the fault detecting circuit comprises a 26V Zener shunt regulator, an OP amp, and a SCR driver;

at least one passive RF noise suppressor for preventing RF noise from being amplified by the OP amp and inadvertently triggering the SCR driver; and wherein the fault detecting circuit is powered by the constant on power supply.

3. The cool running GFCI as in claim 2 further comprises an SCR connected to the SCR driver, wherein the SCR is biased in an off state until driven into conduction by the SCR driver.

4. The cool running GFCI as in claim 3 wherein the SCR is connected to a relay circuit, wherein the relay circuit comprises the solenoid, a transistor Q1, and biasing circuit, wherein the biasing circuit comprises a resistor R4 and Zener Z1 and wherein the transistor Q1 is biased in an on state until the SCR is driven into an on state driving Q1 into an off state.

5. The cool running GFCI as in claim 1 further comprises a filter circuit connected to the constant on power supply and the fault detecting circuit, wherein the filter circuit comprises DC filter capacitor and resistor R22, wherein the filter circuit filters the power from the constant on power supply, to the fault detecting circuit.

6. The cool running GFCI as in claim 1 further comprises a test circuit for testing the cool running GFCI, wherein the test circuit comprises a current limiting resistor and a test switch connected in series between the load line and the neutral line.

7. The cool running GFCI as in claim 1 further comprises an indicator circuit for visual indication of normal operation of the cool running GFCI.

8. The cool running GFCI as in claim 4 further comprises a reset switch connected in parallel with the SCR, wherein the reset switch bias the SCR to its off state when the reset switch is depressed.

* * * * *